US008662367B2

(12) United States Patent
Panaro

(10) Patent No.: US 8,662,367 B2
(45) Date of Patent: Mar. 4, 2014

(54) METHOD FOR IMPROVING THE EFFICIENCY OF AN INTERIOR CLIMATE CONTROL SYSTEM AND THE FUEL EFFICIENCY OF AN AUTOMOBILE

(76) Inventor: Miles R. Panaro, North Myrtle Beach, SC (US)

( * ) Notice: Subject to any disclaimer, the term of this patent is extended or adjusted under 35 U.S.C. 154(b) by 0 days.

(21) Appl. No.: 13/569,807

(22) Filed: Aug. 8, 2012

(65) Prior Publication Data
US 2013/0001928 A1    Jan. 3, 2013

Related U.S. Application Data

(63) Continuation-in-part of application No. 12/660,867, filed on Mar. 5, 2010, now abandoned.

(60) Provisional application No. 61/209,573, filed on Mar. 6, 2009.

(51) Int. Cl.
*B60R 7/04* (2006.01)
*B60H 1/00* (2006.01)

(52) U.S. Cl.
USPC .......................................... 224/542

(58) Field of Classification Search
USPC .............. 224/539–544; 5/94, 118; 280/727
See application file for complete search history.

(56) References Cited

U.S. PATENT DOCUMENTS

| 2,648,072 | A | * | 8/1953 | De Blieux | 5/94 |
| 3,600,725 | A | * | 8/1971 | McCartney | 5/94 |
| 3,648,306 | A | * | 3/1972 | Auerbach | 5/94 |
| 5,185,896 | A | * | 2/1993 | Bonda | 5/118 |
| 5,966,755 | A | * | 10/1999 | Pittman | 5/118 |
| 6,142,574 | A | * | 11/2000 | Alexander | 297/464 |
| 6,537,003 | B1 | * | 3/2003 | Rostoker | 410/119 |
| 7,510,359 | B2 | * | 3/2009 | Sperry et al. | 410/119 |
| 7,905,693 | B2 | * | 3/2011 | Ramirez et al. | 410/119 |
| 2005/0102751 | A1 | * | 5/2005 | Kang | 5/118 |

FOREIGN PATENT DOCUMENTS

EP        553605 A1 *  8/1993

* cited by examiner

*Primary Examiner* — Justin Larson
(74) *Attorney, Agent, or Firm* — Robert M. Downey, P.A.

(57) ABSTRACT

A method for use in an automobile includes the steps of: providing an inflatable device having a shell formed of an airtight, flexible and insulated material that is specifically sized and configured to fill a volume of space within a lower rear interior compartment of the automobile behind the front seats and below the level of a plane extending between the top of the front seats and a bottom edge of the rear window of the automobile; installing the inflatable device within the rear compartment of the automobile; inflating the device and causing the device to completely fill the lower rear interior compartment; reducing the interior air space within the automobile and preventing circulated air of the automobile's climate control system from circulating into the lower rear interior compartment, thereby improving the efficiency of the climate control system and fuel efficiency of the automobile.

2 Claims, 2 Drawing Sheets

METHOD FOR IMPROVING THE EFFICIENCY OF AN INTERIOR CLIMATE CONTROL SYSTEM AND THE FUEL EFFICIENCY OF AN AUTOMOBILE

This application is a Continuation-in-Part (CIP) patent application of patent application Ser. No. 12/660,867 filed on Mar. 5, 2010, now abandoned, which was based on provisional patent application Ser. No. 61/209,573 filed on Mar. 6, 2009.

BACKGROUND OF THE INVENTION

1. Field of the Invention

The present invention relates to space displacement devices for reducing the volume of an interior climate controlled space and, more particularly, to an inflatable pillow device that conforms to the rear floor and rear seat configuration of an automobile to effectively fill unused space rearward of the front seats without obstructing the drivers view through the rear window.

2. Discussion of the Related Art

Only a small percentage of vehicles traveling on roads and highways carry more than 2 passengers and, in fact, most vehicles observed on the road have only a single occupant, the driver. In these single occupant vehicles, the driver is traveling in an interior compartment having an unnecessarily large volume that needs to be maintained at a desired temperature level.

In this modern age, most automobiles are equipped with an interior climate control system that includes air conditioning and heating. Regardless of the outdoor temperature, most vehicles are driven with the windows up and closed to guard against the outdoor elements (e.g., pollution, rain, airborne objects, etc.) and to also reduce drag on the vehicle, thereby providing greater fuel efficiency. With the windows closed, the occupant(s) relies on the climate control system to maintain the desired temperature level within the interior compartment. Naturally, in extremely hot or cold climates, it takes longer to reach the desired interior temperature level. And, because the unused space of the rear portion of the interior compartment contributes to the total volume of the climate controlled interior atmosphere, the one or two occupants of the automobile must endure uncomfortable temperature levels (i.e., either hot or cold) for an extended period of time until the entire interior compartment, including the unused rear space, reaches the desired temperature.

The need to cool or heat the unused lower rear space of the interior compartment of the automobile is extremely inefficient and inconvenient. Moreover, the need to cool or heat the entire interior space of an automobile, including unused space in the rear passenger compartment, requires operation of the air conditioning and/or heating system at full capacity for extended periods of time. This results in decreased fuel efficiency and excess wear on the engine and components, reducing the overall life of the engine, air conditioning and heating system, as well as other engine components. Accordingly, there is a definite need for a lightweight space displacement device that fills unused interior space in the rear passenger compartment of an automobile, to thereby increase the efficiency of the air conditioning and heating system as well as fuel efficiency, while also providing benefits such as safety flotation, and convenient pocket storage with easy and safe driver access to articles, such as roadmaps, while driving.

OBJECTS AND ADVANTAGES OF THE INVENTION

Considering the foregoing, it is a primary object of the present invention to provide a lightweight inflatable space displacement device that generally conforms to the rear floor and rear seat configuration of an automobile in order to fill a volume of space in the rear passenger compartment below the level of the front seat headrests and a top of the rear seat, to thereby reduce the volume of the climate controlled interior air space of the automobile.

It is a further object of the present invention to provide a lightweight space displacement device, as set forth above, which increases the efficiency of the air conditioning and heating system of an automobile.

It is still a further object of the present invention to provide a space displacement device, as set forth above, which allows the interior climate controlled air space of an automobile to be cooled or heated to a desired temperature level in less time.

It is still a further object of the present invention to provide a space displacement device, as set forth above, that provides the ability to reach higher and lower temperature within the interior climate controlled air space of an automobile.

It is yet a further object of the present invention to provide a space displacement device, as set forth above, which increases fuel efficiency, while decreasing pollution, as well as engine and engine component wear.

These and other objects and advantages of the present invention are more readily apparent with reference to the detailed description and accompanying drawings.

SUMMARY OF THE INVENTION

The present invention is directed to an inflatable device that conforms generally to the rear floor and rear seat configuration of an automobile to completely or substantially fill the volume of the rear passenger compartment below the level of the top of the front seats and the bottom edge of the rear window without obstructing the driver's view through the rear window. The space displacement device reduces the volume of the climate controlled air space of the interior passenger compartment, thereby increasing the efficiency of the air conditioning and heating system, while also increasing fuel efficiency. The inflatable space displacement device may further serve as safety flotation in the event the automobile accidentally enters a body of water. The device can be fitted with a tube connected to a mouthpiece for breathing the air contained within the device in the event of an emergency. Pocket compartments are provided on the device for convenient storage and ease of driver access to articles, such as road maps, while driving.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
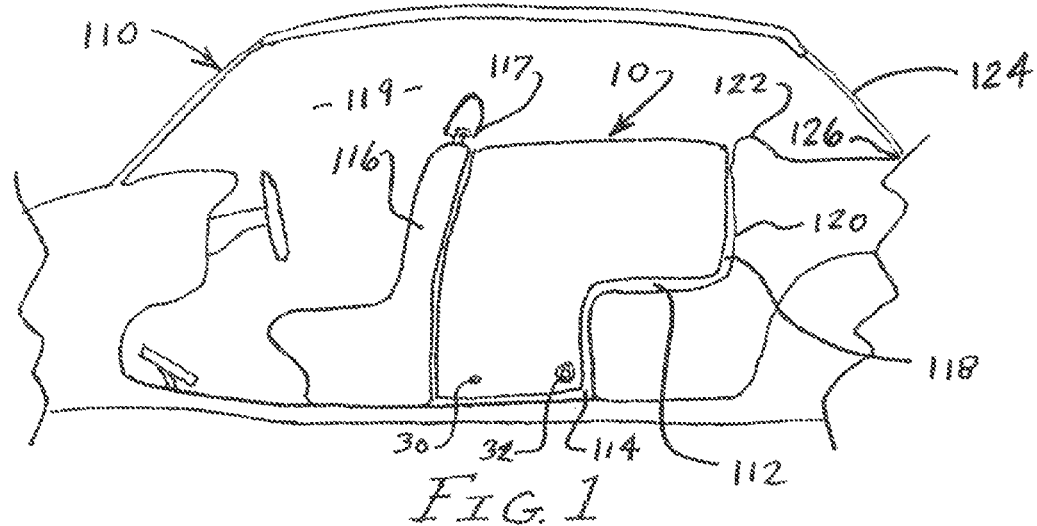
FIG. 1 is a side elevational view of the space displacement device shown inflated and installed in the rear passenger compartment of a vehicle between the backrest of the front and rear seats and extending to the vehicle floor.
Figure 2:
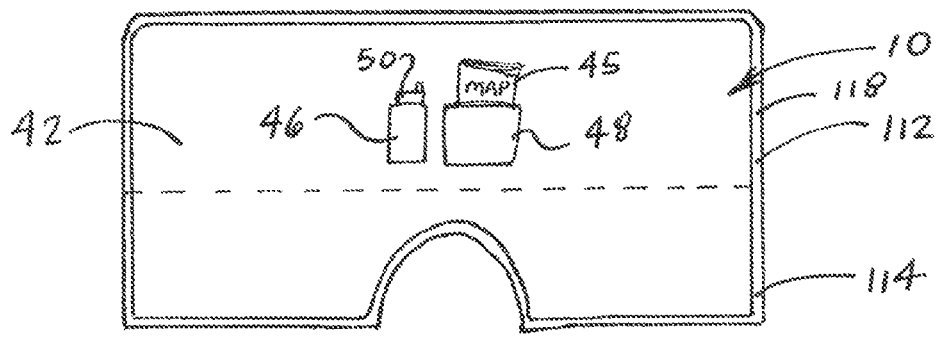
FIG. 2 is a front elevational view showing the space displacement device inflated and illustrating a bottom configuration for conforming to the hump on the rear floor of an automobile having a rear drive system.
Figure 3:
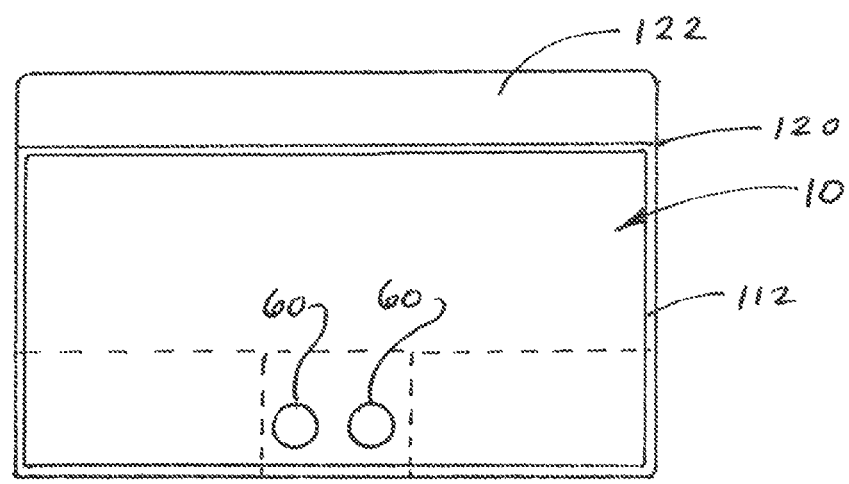
FIG. 3 is a top plan view of the space displacement device, shown inflated in relation to the backseat and floor of an automobile.
Figure 4:
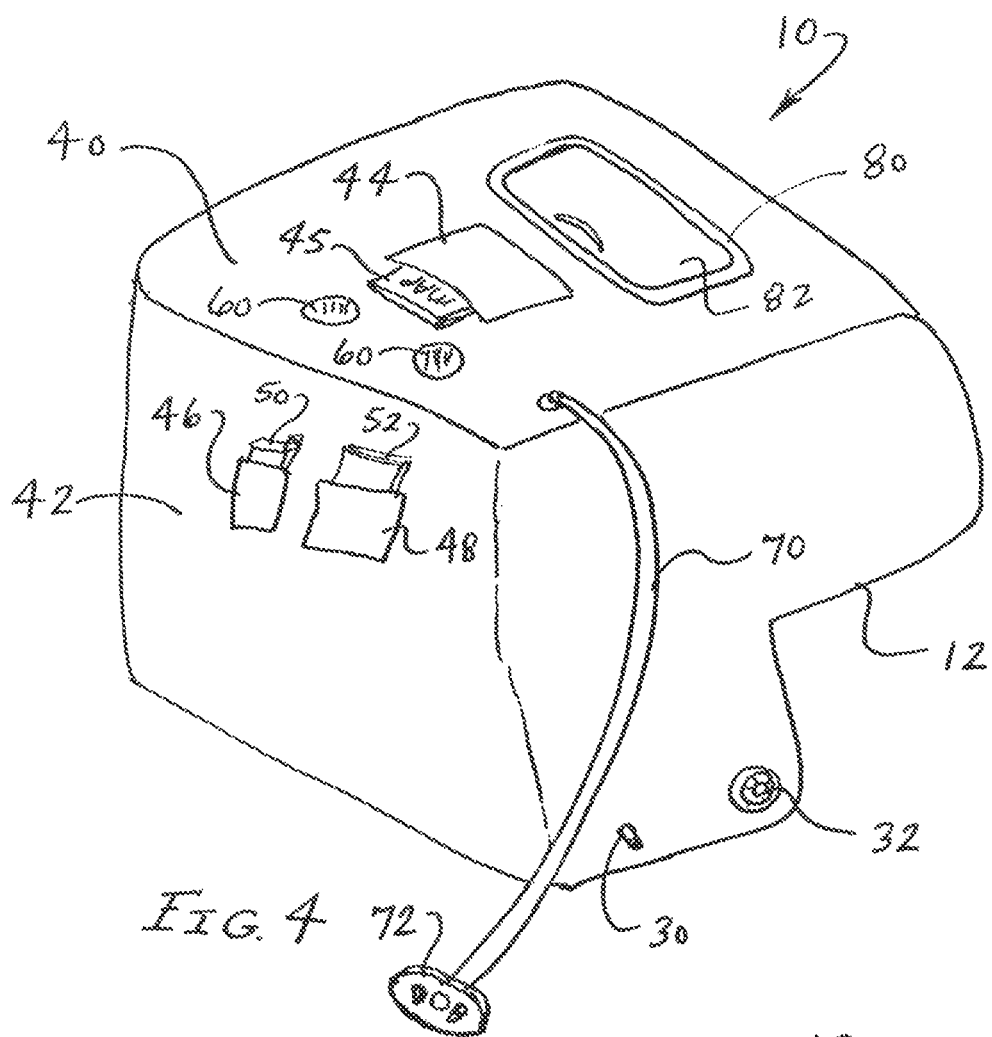
FIG. 4 is a perspective view of the space displacement device shown inflated and removed from the vehicle.
Figure 5:
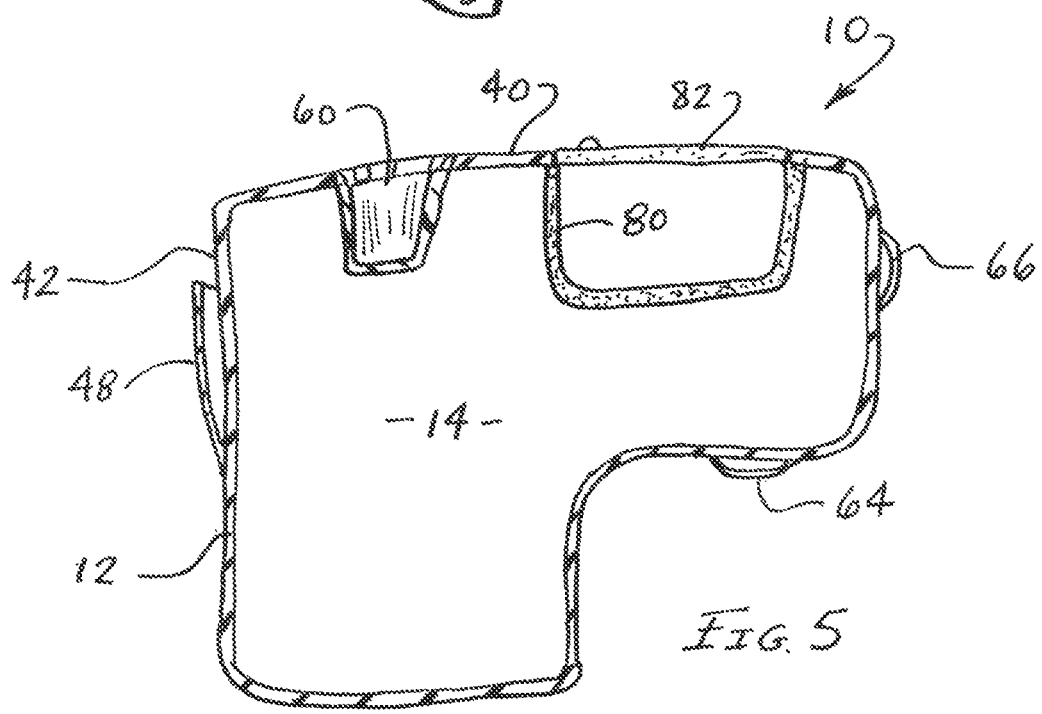
FIG. 5 is a cross-sectional view of the space device according to one preferred embodiment of the invention.

Referring to the several views of the drawings, the inflatable space displacement device is shown and is generally indicated as 10. The space displacement device 10 includes an outer shell 12 that surrounds an air tight interior chamber 14 that is filled with air or another gas when inflated. In a preferred embodiment, the interior chamber 14 is filled with breathable air from a compressed air cartridge or an air pump which may be the same pump used to inflate an automobile's tires.

The exterior shell 12 of the space displacement device 10 is specifically structured and configured to generally conform to the lower rear passenger compartment 112 of an automobile 110, and particularly the floor area 114 behind the front seats 116, the rear seat area 118, as well as a rear cargo area in some vehicles, up to a height that is level with the top of the front seats and the bottom edge 126 of the rear window 124. In accordance with the method and device of the present invention, these combined areas of air space behind the front seats 116 and below the level of the top of the front seats and the bottom edge 126 of the rear window 124 are defined as the lower rear interior compartment of the automobile 110. Various sizes and configurations of the shell 12 are fully contemplated in the spirit of the invention in order to accommodate most car models. In a preferred embodiment, the shell 12 is a one piece structure and is formed of a relatively thin, yet durable and insulated material with approximately 10% elasticity, allowing the shell 12 to expand and conform to the configuration of the lower rear passenger area and/or rear cargo compartment while firmly holding the space displacement device 10 in place to fill the floor area 114, seat area 118 and/or cargo compartment as described above. In a preferred embodiment, the device 10 is inflated with either a compressed air cartridge or the same pump used to inflate the car tires. In addition to a SCHRADER valve 30, a larger valve or closable port 32 may be provided to allow for rapid deflation of the device, as well as optional inflation using a hose connection that fits to the larger port.

The inflatable space displacement device 10 is ideally suited for climates with extreme high or low temperatures, such as Florida in the summer and Alaska during the winter. The space displacement device 10 is also useful to increase humidity within the interior climate controlled air space of an automobile when in particularly dry and hot climates, such as in Arizona. In this instance, humidity is increased by reducing the amount of time the air-conditioning needs to fun in order to achieve the desired temperature. Naturally, the air contained within the interior chamber 14 of the shell 12 serves as a good insulator, thus reducing the volume of the interior climate controlled air space of the automobile that needs to be air-conditioned or heated. It is estimated that the device 10 will displace approximately 20%-30% of the interior space of an automobile. By displacing the space in the lower rear passenger area 112, cold air from the air conditioner is prevented from dropping down behind the front seats 116. Instead, the cold air is maintained higher and in the front seat area 119. Moreover, if the rear windows of the automobile 110 are opened while driving for ventilation, the device 10 allows for better air flow by preventing air flow from dipping down into the lower rear interior compartment towards the rear floor area 114 and thereby eliminating eddy currents. The benefits of reducing the climate controlled air space are set forth above.

The top side 40 and horizontal sides of the device 10 may be provided with pockets and storage compartments. In particular, pockets 44 on the top of the device 10 provide a convenient place for holding road maps 45 that are easily accessible and retrievable by the driver or front passenger. One or more pockets 46, 48 may also be provided on the vertical front side 42 of the device 10, between the front seats of the vehicle, for holding electronic devices, a cell phone 50, magazines, 52 maps, and the like. This location is particularly convenient for access by the passenger and driver and is ideally positioned for electronic devices 50 (e.g. cell phones, MP3 players) that can be plugged into the front cigarette lighter for power. Additionally, cup holders 60 may be provided on the top side 40, between the two front seats, so that the front seat passenger and driver can reach back to retrieve a beverage while driving.

In addition to reducing the volume of the interior climate controlled air space of an automobile, the inflatable device 10 also serves as a safety flotation device when properly installed in an automobile. For example, considering the volume of the interior air chamber 14 of the shell 12 to be approximately 150 gallons, the equivalent of approximately 1,200 pounds of flotation (i.e., water displacement) can be achieved. This additional flotation can substantially slow down the rate of submerging and may serve to maintain the automobile 110 afloat should the automobile accidentally enter a body of water. The automobile's rear seatbelts should be fastened to the space displacement device 10, using straps 64, with sufficient slack to allow the device to float up in the car when water intrudes, thereby allowing the device 10 to generally conform to the area in the upper portion of the rear passenger compartment, without interfering with the driver and front passenger. The shell 12 of the device 10, having about 10% elasticity, will allow even distribution of air pressure, resisting an air leak by puncture. The automobile's seat belt should be tight enough to keep the device 10 within the rear passenger compartment area so as to not encumber or suffocate the passenger and driver in the front seats.

Additionally, the device may be fitted with a tube 70 connected to a mouthpiece 72 similar to a skin diving snorkel or buddy-breather on a SCUBA regulator. The interior chamber 14, within the shell 12 of the device 10, will hold approximately 22 cubic feet of air when inflated, just over 25% of an average SCUBA tank. When close to the surface of the water, an average person should be able to breathe the air from the interior chamber 14 of the device for approximately 15 minutes. The mouthpiece 72 and tube 70 can also be used to manually inflate the device 10. In an extreme flood emergency, the inflatable space displacement device 10 can be used as a personal flotation device (PFD). The exterior of the shell 12 of the device may be provided with straps 66 or handles to hold the device 10 to the chest, in accordance with U.S. Coast Guard instructions for personal flotation devices.

In another embodiment, the shell 12 may be made of a MYLAR material, or similar material, and the interior chamber 14 filled with helium to provide a "lighter than air" device 10 that can be strapped into the vehicle, using the vehicles rear seatbelts. The device 10, when filled with helium, will reduce the overall weight of the vehicle, which may help to increase fuel efficiency, while also increasing buoyancy.

The device 10 may further be fitted with a top cover that can be removed and attached with the use of hook and loop fasteners. For instance, the cover may be white on one side and black on the opposite side for use during different climate conditions. For example, in the summer the white side of the cover can be placed facing up to reflect sunlight and heat. In the winter, the cover device can be turned over so that the black side faces up to absorb heat from the sun. Alternatively, the cover can be printed or otherwise provided with graphics, such as a team logo. For example, college team logos can be applied to the cover and attached to the top of the device to display the logo which is easily visible through the windows of the vehicle.

While the present invention has been shown and described in accordance with a preferred and practical embodiment thereof, it is recognized that departures from the instant disclosure are contemplated within the spirit and scope of the present invention.

What is claimed is:

1. A method for improving the efficiency of an interior climate control system and the fuel efficiency of an automobile having front seats and a lower rear interior compartment behind the front seats, the method comprising the steps of:

providing an inflatable device having a shell formed of an airtight, flexible and insulated material that is specifically sized and configured to fill a volume of space within the lower rear interior compartment of the automobile;

installing the inflatable device within the lower rear interior compartment of the automobile;

inflating the device and filling the rear interior compartment of the automobile up to a level extending between a top of the front seats and a bottom edge of a rear window of the automobile; and controlling air circulation within the automobile and preventing circulating air within the automobile from dropping down below the level extending between the top of the front seats and the bottom edge of the rear window and thereby avoiding eddy currents of trapped circulating air in the lower rear interior compartment.

2. The method as recited in claim 1 wherein said step of inflating the device further comprises:

inflating the device with a gas containing at least part helium.

\* \* \* \* \*